United States Patent
Shokar

(10) Patent No.: US 10,041,197 B1
(45) Date of Patent: Aug. 7, 2018

(54) REINFORCED NONWOVEN MATERIAL AND METHOD OF USE FOR FURNITURE

(71) Applicant: Novum Microfiber Corp., Vancouver (CA)

(72) Inventor: Bobby Shokar, Vancouver (CA)

(*) Notice: Subject to any disclaimer, the term of this patent is extended or adjusted under 35 U.S.C. 154(b) by 0 days.

(21) Appl. No.: 15/722,505

(22) Filed: Oct. 2, 2017

Related U.S. Application Data

(60) Provisional application No. 62/519,197, filed on Jun. 14, 2017.

(51) Int. Cl.
| | |
|---|---|
| *D04H 5/00* | (2012.01) |
| *D04H 1/06* | (2012.01) |
| *D04H 3/02* | (2006.01) |
| *D04H 1/4374* | (2012.01) |
| *B32B 5/02* | (2006.01) |
| *B32B 27/32* | (2006.01) |
| *B32B 27/18* | (2006.01) |
| *B29C 59/04* | (2006.01) |
| *A47C 31/10* | (2006.01) |
| *A47C 31/04* | (2006.01) |

(52) U.S. Cl.
CPC ........... *D04H 1/4374* (2013.01); *A47C 31/04* (2013.01); *A47C 31/10* (2013.01); *B29C 59/04* (2013.01); *B32B 5/022* (2013.01); *B32B 27/18* (2013.01); *B32B 27/32* (2013.01); *B32B 2305/38* (2013.01); *B32B 2307/54* (2013.01); *B32B 2307/72* (2013.01); *D10B 2321/021* (2013.01); *D10B 2321/022* (2013.01); *D10B 2505/08* (2013.01)

(58) Field of Classification Search
CPC ......... B32B 5/022; B32B 27/32; B32B 27/18; B32B 2307/72; B32B 2305/38; B32B 2307/54; B29C 59/04; A47C 41/10; A47C 31/04; D10B 2321/022; D10B 2321/021; D10B 2505/08; D04H 1/4374
USPC ..................................................... 156/244.11
See application file for complete search history.

(56) References Cited

U.S. PATENT DOCUMENTS

| | | | | |
|---|---|---|---|---|
| 6,740,609 B1* | 5/2004 | Peng | .......................... | D01F 1/10 442/301 |
| 7,517,570 B1* | 4/2009 | Li | .......................... | B60R 21/235 280/728.1 |
| 2007/0072502 A1* | 3/2007 | Underwood | ............. | D03D 1/00 442/82 |
| 2007/0207186 A1* | 9/2007 | Scanlon | .................... | A61F 2/07 424/424 |
| 2008/0086808 A1* | 4/2008 | Sutton | .................... | D03D 15/00 4/498 |

* cited by examiner

*Primary Examiner* — Philip Tucker
*Assistant Examiner* — Vicki Wu
(74) *Attorney, Agent, or Firm* — Kevin Keener; Keener and Associates P.C.

(57) ABSTRACT

A novel nonwoven material for use as a cover of bedding and furniture is disclosed. The inventive method comprises creating a layered nonwoven material, cutting one or more desired shapes from a portion of said layered nonwoven material; securely attaching a first portion of said one or more desired shapes to a second portion of said one or more desired shapes to create a cover containing an internal cavity; and placing a furniture item within said internal cavity of said cover. The furniture item is selected from a group comprising a pillow, a cushion, a mattress, and a duvet.

19 Claims, 2 Drawing Sheets

REINFORCED NONWOVEN MATERIAL AND METHOD OF USE FOR FURNITURE

PRIORITY

This application claims priority to U.S. Provisional Patent Application Ser. No. 62/519,197 filed Jun. 14, 2017, the disclosure of which is hereby fully incorporated by reference.

FIELD OF THE INVENTION

The invention pertains generally to nonwoven materials and more specifically to a specially designed nonwoven material for use in the bedding and upholstery and its method of use.

BACKGROUND OF INVENTION

Nonwoven materials are known in the industry. Nonwoven materials are formed of mat of intermingled fibers such that the fibers are not in any specific designed configuration or weave. The formation of generic sheets of nonwoven materials, and their use in industry, is known. However, what is needed is a specific design of nonwoven material specifically utilized in bedding and upholstery applications.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention is directed toward a method of use of a novel nonwoven material for use as a cover of bedding and furniture. The inventive method comprises creating a layered nonwoven material, cutting one or more desired shapes from a portion of said layered nonwoven material; securely attaching a first portion of said one or more desired shapes to a second portion of said one or more desired shapes to create a cover containing an internal cavity; and placing a furniture item within said internal cavity of said cover. The furniture item is selected from a group comprising a pillow, a cushion, a mattress, and a duvet.

Creating the layered nonwoven material comprises creating a material mixture (by adding in substantially eighty-five percent by weight of polypropylene; adding in substantially ten percent by weight of polyethylene; adding in substantially three percent by weight of ethylene methyl acrylate; and adding in substantially two percent by weight of a UV stabilizer); heating said material mixture; extruding said material mixture; creating a first layer of nonwoven material formed from said material mixture; placing a layer of woven mesh on top of said first layer; depositing a second layer of nonwoven material formed from said material mixture on top of said layer of woven mesh such that said layer of woven mesh is disposed between said first layer of nonwoven material and said second layer of nonwoven material; and calendaring said layered nonwoven material.

In one embodiment step of securely attaching a first portion of said one or more desired shapes to a second portion of said one or more desired shapes is completed by a means of selected from a group consisting of: sewing, melting, and ultrasonic welding.

The method may further comprise attaching a securing component to a portion of said cover, wherein said securing component is selected from a group consisting of a zipper, one or more hooks, or one or more buttons. The method may further comprise ensuring said furniture item is disposed in a desired orientation within said cover. The method as in claim 1 further comprising placing an embossing pattern on a top surface of said layered nonwoven material with an embossing roll. The method may further comprise confirming that one or more markings on a surface of said cover are undistorted or in a correct position relative to said furniture item.

The method may further comprise heating a portion of said layered nonwoven material; and stretching a portion of said layered nonwoven material over a mold. The method may further comprise testing a plurality of physical properties of a portion of said layered nonwoven material; and verifying that each of said plurality of physical properties are within a variance of ten percent of a set of preferred values Still other embodiments of the present invention will become readily apparent to those skilled in this art from the following description wherein there is shown and described the embodiments of this invention, simply by way of illustration of the best modes suited to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

Various exemplary embodiments of this invention will be described in detail, wherein like reference numerals refer to identical or similar components, with reference to the following figures, wherein.

DETAILED DESCRIPTION OF THE PREFERRED EMBODIMENT

Figure 1:
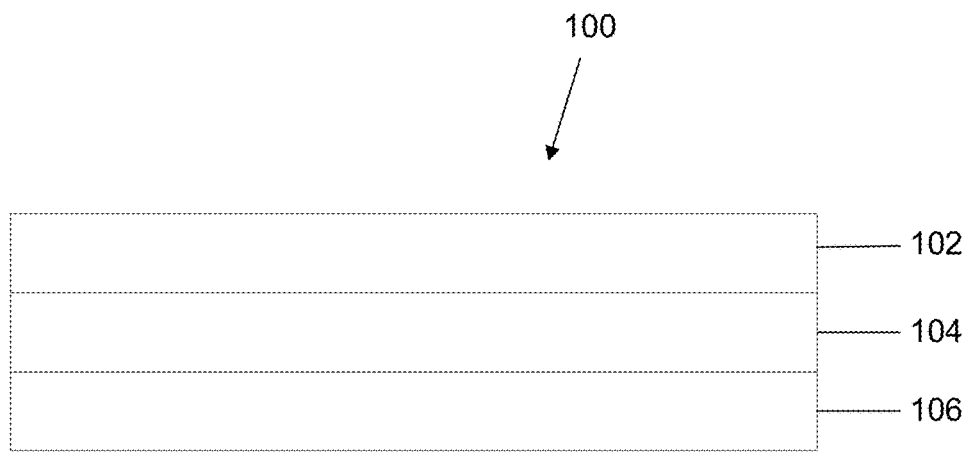
FIG. 1 is a side cutaway view of the inventive material.

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims.

The nonwoven material is specially engineered product for use in bedding and furniture applications. The nonwoven material is formed from a polymer, an elastomer, and selective additives. The nonwoven material may be formed from any combination of materials. However, in the preferred embodiment the nonwoven material is formed from polypropylene, elastomeric copolymer, a mesh grid, and selective UV and other additives. The combination of elastomeric copolymer and mesh grid, the resulting nonwoven material exhibits enhanced chemical and mechanical static and kinetic coefficients of friction. This increased coefficient of friction enhances the slip resistance of the product for safety. The elastomeric copolymer utilized enhances the chemical coefficient of friction of the material. The mesh grid enhances the mechanical coefficient of friction, or slip resistance, of the nonwoven material. The elastomeric copolymer utilized has a tacky chemical property which increases the chemical coefficient of friction.

The process of formation is similar to the process described in U.S. Pat. No. 6,740,609 (Peng et al.), the disclosure of which is hereby incorporated by reference. The process of forming the nonwoven material begins with blending a desired amount of polypropylene, elastomeric copolymer, and additives. The materials are then blended and heated to the point of melting. The melted blend of materials are then forced through a screw, barrel, and die. The melted material blend is then forced through a spinneret.

The melted blend of materials cools after passing through the spinneret to form filaments. The filaments are bound together in random orientations. The filaments are then stretched. In the preferred embodiment the bound filaments are stretched in the machine direction although the material may be stretched in any direction. The filaments are then passed through high speed flappers. The flappers orient the filaments in the proper orientation to increase the tensile and mechanical strength in the cross direction.

The filaments are then distributed and laid to form a first layer of nonwoven material. A layer of woven material is then deposited on top of the first layer of nonwoven material. Additional filaments are then deposited on top of the layer of woven material to form a second layer of nonwoven material. Multiple layers of woven and nonwoven material may be attached together.

The combined layers are then calendared between a seam roll and an embossing roll. The embossing roll may apply any pattern to the surface of the resulting material. The combined material may be calendared at any temperature. The rolls used in the calendaring process may be heated or cooled. The resulting material is then wound into a roll of finalized product.

The resulting nonwoven material may have any number of properties. The nonwoven material has specific physical properties in its preferred embodiments. In one embodiment the material has the following physical properties (with a variance of +/-10%):

Density of 0.9 grams per cubic centimeter as measured under ASTM D1505
Product weight of 55 grams per square meter as measured under ASTM D3776
Machine direction tensile strength of 41 pounds as measured under ASTM D5034
Cross direction tensile strength of 33 pounds as measured under ASTM D5034
Machine direction elongation of 65% as measured under ASTM D5034
Cross direction elongation of 75% as measured under ASTM D5034
Machine direction trapezoid tear of 14 pounds as measured under ASTM D4533
Cross direction trapezoid tear of 14 pounds as measured under ASTM D4533
Water permeability of 52 liters per square meter per second as measured under ASTM D4491
Permittivity of 1.04 per second as measured under ASTM D4491

In another embodiment of the invention the nonwoven material has the following physical properties (with a variance of +/-10%):

Density of 0.9 grams per cubic centimeter as measured under ASTM D1505
Product weight of 85 grams per square meter as measured under ASTM D3776
Machine direction tensile strength of 72 pounds as measured under ASTM D5034
Cross direction tensile strength of 51 pounds as measured under ASTM D5034
Machine direction elongation of 65% as measured under ASTM D5034
Cross direction elongation of 75% as measured under ASTM D5034
Machine direction trapezoid tear of 17 pounds as measured under ASTM D4533
Cross direction trapezoid tear of 22 pounds as measured under ASTM D4533
Water permeability of at least 40 liters per square meter per second as measured under ASTM D4491
Permittivity of 0.8 per second as measured under ASTM D4491

Referring to FIG. 1, the preferred embodiment of the material 100 is illustrated. The material 100 is formed in layers. A first layer of nonwoven polypropylene 102 is laid down. Then an inner layer of mesh 104 is applied. The inner layer of mesh 104 is any woven material. In the preferred embodiment, the mesh 104 utilized has a standard grid structure, formed as a series of squares. In other embodiments, the mesh may be formed of material in other shapes—such as triangles or hexagons. Then the top layer of nonwoven polypropylene 106 is applied.

Any type of nonwoven material may be applied to the material 100. In the preferred embodiment the nonwoven material has a specific recipe for formation. In the preferred embodiment the nonwoven material is formed from 85% polypropylene by weight, 10% polyethylene by weight, 3% ethylene methyl acrylate by weight, and 2% UV stabilization compound by weight. The UV stabilization compound is any compound configured to prolong the life of the resulting polymer material by blocking the absorption of UV rays. The UV stabilization compound may be selected from among known UV stabilization compounds such as rutile titanium dioxide, hydroxybenzophenone, hydroxyphenylbenzotriazole, carbon black, oxanilide, benzophenone, benzotriazole, hydroxyphenyltriazine, Hindered Amine Light Stabilizers (HALS), or a combination thereof.

Figure 2:
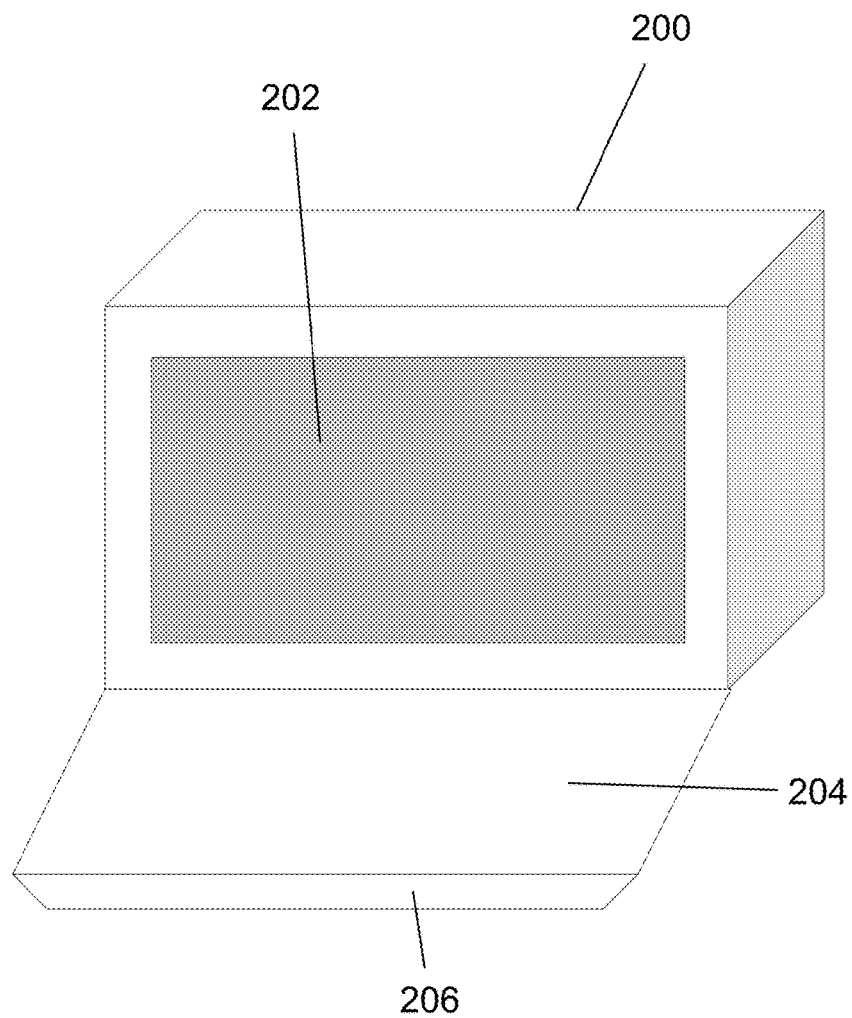
FIG. 2 is a perspective view of a cover.

Referring to FIG. 2, the material 100 can be used as bedding material to form a cover 200. The cover 200 can be used as an allergy cover for a mattress, an allergy cover for pillows, or an allergy cover for a duvet. When used in this manner a user may take a chosen portion of the material 100 and form it into a desired shape. In this manner the material 100 is formed to have an internal cavity 202 for fitting a desired section of bedding. The material 100 may be cut and sewn into a desired shape to form a cavity 202, or sewn together with other sections of the material 100 to form the cover 200. Alternatively, the separate sections of the material 100 may be fused together by other means to create a tight seal, such as by heating and melting portions together or other methods. In other embodiments the material 100 may be formed to have a desired cavity 202 shape so that there is a seamless cavity formed. The cover 200 may be formed to have a flap 204 which would be utilized to enclose the cavity 202. The user may then add a means to secure and close the cavity, such as by adding a zipper 206. The zipper 206 is utilized to close the flap 204 to the body of the cover 200 and enclose the cavity 202. Alternatively, other means may be utilized to enclose the cavity 202, such as hooks, buttons, or other securing components to securely enclose the cavity.

To use the cover 200, an individual takes the cover 200, places a desired furniture item within the cavity 202 of the cover 200. The user then closes the flap 204 of the cover 200. Finally, the user engages the zipper 206 to keep the flap 204 closed. The cover 200 may have any shape and configuration and may be any size. When the cover 200 is placed on a furniture item, the user may confirm that the furniture item is positioned in a desired configuration within the cover 200. The cover 200 may have one or more markings to illustrate the proper configuration of the furniture item within the cover 200. The user may confirm that the markings are in a proper position on the furniture item. Also, the user may confirm that the markings are not distorted to confirm that the furniture item is in the correct orientation. In this manner the markings may become distorted if the furniture item is in a wrong configuration as portions of the cover 200 may become stretched. Once the furniture item is in the correct orientation, no portions of the cover 200 are stretched and the markings are not distorted.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The invention claimed is:

1. A method for utilizing a nonwoven material comprising
a) creating a layered nonwoven material, comprising the steps
   i) creating a material mixture; wherein creating comprises the steps of
      (1) adding eighty-five percent by weight of polypropylene;
      (2) adding ten percent by weight of polyethylene;
      (3) adding three percent by weight of ethylene methyl acrylate;
      (4) adding two percent by weight of a UV stabilizer;
   ii) heating said material mixture;
   iii) extruding said material mixture;
   iv) creating a first layer of nonwoven material formed from said material mixture after said material mixture is heated and extruded;
   v) placing a layer of woven mesh on top of said first layer;
   vi) depositing a second layer of nonwoven material formed from said material mixture after said material mixture is heated and extruded, on top of said layer of woven mesh such that said layer of woven mesh is disposed between said first layer of nonwoven material and said second layer of nonwoven material;
b) calendaring said layered nonwoven material;
c) cutting one or more desired shapes from a portion of said layered nonwoven material after said layered nonwoven material is calendared;
d) securely attaching a first portion of said one or more desired shapes to a second portion of said one or more desired shapes to create a cover containing an internal cavity; and
e) placing a furniture item within said internal cavity of said cover
   i) wherein said furniture item is selected from a group consisting of a pillow, a cushion, a mattress, and a duvet.

2. The method as in claim 1 wherein the step of securely attaching a first portion of said one or more desired shapes to a second portion of said one or more desired shapes is completed by a means of selected from a group consisting of: sewing, melting, and ultrasonic welding.

3. The method as in claim 1 further comprising attaching a securing component to a portion of said cover, wherein said securing component is selected from a group consisting of a zipper, one or more hooks, or one or more buttons.

4. The method as in claim 1 further comprising ensuring said furniture item is disposed in a desired orientation within said cover.

5. The method as in claim 1 further comprising placing an embossing pattern on a top surface of said layered nonwoven material with an embossing roll.

6. The method as in claim 1 further comprising confirming that one or more markings on a surface of said cover are undistorted or in a desired position relative to said furniture item.

7. The method as in claim 1 further comprising
a) heating a portion of said layered nonwoven material; and
b) stretching a portion of said layered nonwoven material over a mold.

8. The method as in claim 1 further comprising
a) testing a plurality of physical properties of a portion of said layered nonwoven material; and
b) verifying that each of said plurality of physical properties are within a variance of ten percent of a set of preferred values
   i) wherein said set of preferred values comprise
      (1) a density of 0.9 grams per cubic centimeter;
      (2) a product weight of 55 grams per square meter;
      (3) a machine direction tensile strength of 41 pounds;
      (4) a cross direction tensile strength of 33 pounds;
      (5) a machine direction elongation of 65%;
      (6) a cross direction elongation of 75%;
      (7) a machine direction trapezoid tear of 14 pounds;
      (8) a cross direction trapezoid tear of 14 pounds;
      (9) a water permeability of 52 liters per square meter per second; and
      (10) a permittivity of 1.04 per second.

9. The method as in claim 1 further comprising
a) testing a plurality of physical properties of a portion of said layered nonwoven material; and
b) verifying that each of said plurality of physical properties are within a variance of ten percent of a set of preferred values
   i) wherein said set of preferred values comprise (1) a density of 0.9 grams per cubic centimeter;
(2) a product weight of 85 grams per square meter;
(3) a machine direction tensile strength of 72 pounds;
(4) a cross direction tensile strength of 51 pounds;
(5) a machine direction elongation of 65%;
(6) a cross direction elongation of 75%;
(7) a machine direction trapezoid tear of 17 pounds;
(8) a cross direction trapezoid tear of 22 pounds;
(9) a water permeability of at least 40 liters per square meter per second; and
(10) a permittivity of 0.8 per second.

10. The method as in claim 8 wherein the step of securely attaching a first portion of said one or more desired shapes to a second portion of said one or more desired shapes is completed by a means of selected from a group consisting of: sewing, melting, and ultrasonic welding.

11. The method as in claim 10 further comprising attaching a securing component to a portion of said cover, wherein said securing component is selected from a group consisting of a zipper, one or more hooks, or one or more buttons.

12. The method as in claim 11 further comprising ensuring said furniture item is disposed in a desired orientation within said cover.

13. The method as in claim 12 further comprising
a) heating a portion of said layered nonwoven material; and
b) stretching a portion of said layered nonwoven material over a mold.

14. The method as in claim 13 further comprising placing an embossing pattern on a top surface of said layered nonwoven material with an embossing roll.

15. The method as in claim 9 wherein the step of securely attaching a first portion of said one or more desired shapes to a second portion of said one or more desired shapes is completed by a means of selected from a group consisting of: sewing, melting, and ultrasonic welding.

16. The method as in claim 15 further comprising attaching a securing component to a portion of said cover, wherein said securing component is selected from a group consisting of a zipper, one or more hooks, or one or more buttons.

17. The method as in claim 16 further comprising ensuring said furniture item is disposed in a desired orientation within said cover.

18. The method as in claim 17 further comprising
a) heating a portion of said layered nonwoven material; and
b) stretching a portion of said layered nonwoven material over a mold.

19. The method as in claim 18 further comprising placing an embossing pattern on a top surface of said layered nonwoven material with an embossing roll.

* * * * *